(12) United States Patent
Yamada

(10) Patent No.: US 6,897,303 B2
(45) Date of Patent: May 24, 2005

(54) PROCESS FOR PRODUCING CELLULOSE ACYLATE FILM

(75) Inventor: Tsukasa Yamada, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 10/391,797

(22) Filed: Mar. 20, 2003

(65) Prior Publication Data

US 2004/0124557 A1 Jul. 1, 2004

Related U.S. Application Data

(63) Continuation-in-part of application No. 10/380,240, filed as application No. PCT/JP01/07949 on Sep. 13, 2001.

(30) Foreign Application Priority Data

Sep. 13, 2000 (JP) ........................................ 2000-278034

(51) Int. Cl.$^7$ ........................... C08B 13/00; C08B 3/00; C07H 1/00
(52) U.S. Cl. ............................. 536/58; 536/63; 536/64; 536/65; 536/68; 536/69; 536/124
(58) Field of Search ............................. 536/58, 63, 64, 536/65, 68, 69, 124

(56) References Cited

FOREIGN PATENT DOCUMENTS

| EP | 723993 A1 | 7/1996 |
|---|---|---|
| JP | 10-48779 A | 2/1998 |
| JP | 10-60170 A | 3/1998 |
| JP | 10-060170 | 3/1998 |
| JP | 11-71464 A | 3/1999 |
| JP | 11-292989 A | 10/1999 |
| JP | 11-322947 | 11/1999 |
| JP | 11-322947 A | 11/1999 |
| JP | 2000-95876 A | 4/2000 |
| JP | 2000-095876 | 4/2000 |

*Primary Examiner*—James O. Wilson
*Assistant Examiner*—Everett White
(74) *Attorney, Agent, or Firm*—Burns, Doane, Swecker & Mathis, L.L.P.

(57) ABSTRACT

A cellulose acetate film is produced from a solution of a cellulose acylate in a mixed solvent. The mixed solvent comprises a main solvent and an alcohol. The mixed solvent essentially does not contain chlorine atom. The main solvent comprises an ester and a ketone. The ester has a solubility parameter of 16 to 23. The ketone has a solubility parameter of 16 to 23. The alcohol has a solubility parameter of 20 to 30. The mixed solvent comprises the ester in an amount of 58 to 96 wt. %, the ketone in an amount of 2 to 15 wt. %, and the alcohol in an amount of 2 to 40 wt. %.

13 Claims, No Drawings

PROCESS FOR PRODUCING CELLULOSE ACYLATE FILM

This application is a continuation-in-part of U.S. application Ser. No. 10/380,240 filed on Mar. 13, 2003, now abandoned, the entire contents of which are hereby incorporated by reference, which is a national stage filing under 35 U.S.C. §371 of International Application No. PCT/JP01/07949 filed on Sep. 13, 2001, the entire contents of which are hereby incorporated by reference.

FIELD OF THE INVENTION

The present invention relates to a process for producing a cellulose acylate film.

BACKGROUND OF THE INVENTION

A cellulose acylate film is used in various photographic or optical elements because it is tough and has enough flame retardant properties. The cellulose acylate film is generally produced according to the solvent cast method, in which a solution (dope) containing a cellulose acylate dissolved in a solvent is cast on a support and then the solvent is evaporated to form the film. As the solvent, a chlorine-containing solvent comprising 70 wt. % or more of dichloromethane has been conventionally used. In consideration of environmental preservation, it has been studied to replace the chlorine-containing solvent with a non-chlorine-containing solvent such as acetone, methyl acetate, tetrahydrofuran, 1,3-dioxolane, nitromethane, 1,4-dioxolane, epichlorohydrin or N-methylpyrrolidone. However, some of these non-chlorine-containing solvents cannot give the solution (dope) in a sufficient concentration, and others have too high boiling points to dry. Further, even if the film is formed from the dope using the non-chlorine-containing solvent, peroxides are liable to precipitate in drying the film, so that there is a fear of explosion. For these reasons, the non-chlorine-containing solvents are not practically used.

SUMMERY OF THE INVENTION

An object of the present invention is to improve the temporal stability of a solution in which cellulose acylate is dissolved essentially in non-chlorine-containing solvent, and thereby to provide a process for producing a cellulose acylate film on which uneven retardation hardly appears.

The present invention provides a process for producing a cellulose acylate film, comprising the steps of: dissolving cellulose acylate in a mixed solvent comprising a main solvent and an alcohol to prepare a solution, wherein the mixed solvent essentially does not contain chlorine atom, wherein the main solvent comprises an ester and a ketone, said ester having a solubility parameter of 16 to 23, said ketone having a solubility parameter of 16 to 23, and said alcohol having a,solubility parameter of 20 to 30, and wherein the mixed solvent comprises the ester in an amount of 58 to 96 wt. %, the ketone in an amount of 2 to 15 wt. %, and the alcohol in an amount of 2 to 40 wt. %; and forming the film from the prepared solution.

Preferred embodiments of the invention are shown below.

(1) The ester has 3 to 12 carbon atoms.
(2) The ketone has 3 to 12 carbon atoms.
(3) The alcohol has 1 to 8 carbon atoms.
(4) The ester has a boiling point of 250° C. or below.
(5) The ketone has a boiling point of 250° C. or below.
(6) The alcohol has a boiling point of 250° C. or below.
(7) The mixed solvent comprises the ester in an amount of 60 to 94 wt. %.
(8) The mixed solvent comprises the ketone in an amount of 3 to 15 wt. %.
(9) The mixed solvent comprises the alcohol in an amount of 3 to 30 wt. %.
(10) The cellulose acylate has acyl groups substituting for hydroxyls of cellulose to satisfy all the following conditions (I) to (IV):

$$2.6 \leq A+B \leq 3.0 \tag{I}$$

$$2.0 \leq A \leq 3.0 \tag{II}$$

$$0 \leq B \leq 0.8 \tag{III}$$

$$1.9 < A-B \tag{IV}$$

in which A and B are substitution degrees of acyl groups substituting for hydroxyls of cellulose, A is the substitution degree of acetyl group, and B is that of acyl groups having 3 to 5 carbon atoms.

(11) The cellulose acylate is cellulose acetate.
(12) The step of dissolving cellulose acylate comprises a procedure for cooling to a temperature of −80 to 0° C.
(13) The process as defined in claim 1, wherein the step of dissolving cellulose acylate comprises a procedure for heating to a temperature of 40 to 200° C.
(14) The prepared cellulose acylate solution has a square radius of inertia in the range of 40 to 200 nm.

The process for producing a cellulose acylate film comprises the steps of dissolving cellulose acylate in a mixed solvent, and forming the film from the prepared solution. The mixed solvent comprises a main solvent and an alcohol. The mixed solvent essentially does not contain chlorine atom. The main solvent comprises an ester and a ketone. The ester has a solubility parameter of 16 to 23. The ketone has a solubility parameter of 16 to 23. The alcohol has a solubility parameter of 20 to 30. The mixed solvent comprises the ester in an amount of 58 to 96 wt. %, the ketone in an amount of 2 to 15 wt. %, and the alcohol in an amount of 2 to 40 wt. %. According to the present invention, the temporal stability of the prepared solution (dope) is so improved that a cellulose acylate film having excellent mechanical strength and optical characters can be obtained.

DETAILED DESCRIPTION OF THE INVENTION

Cellulose, which is a starting material for preparing cellulose acylate used in the invention, can be obtained from cotton linter or wood pulp. Cellulose acylate derived from any cellulose material can be used, and some kinds of cellulose acylate derived from two or more cellulose materials may be mixed to use in combination. The cellulose acylate of the invention has acyl groups substituting for hydroxyls of cellulose, and the acyl groups satisfy all the above conditions (I) to (IV).

In the above formulas, A and B are substitution degrees of acyl groups replacing hydroxyls of cellulose. In detail, A is the substitution degree of acetyl group, and B is that of acyl groups having 3 to 5 carbon atoms. Cellulose generally has three hydroxyls per one glucose unit, and the substitution degree A or B means how many of the three hydroxyls are substituted in average with the acetyl group or the acyl groups having 3 to 5 carbon atoms, respectively. Accordingly, each substitution degree is at the most 3.0. The substitution degrees A and B can be obtained by measuring and calculating the contents of acetic acid and fatty acids having 3 to 5 carbon atoms displacing hydroxyls of cellulose, respectively. The measurement can be carried out according to ASTM, D-817-91.

A cellulose acylate under the condition of B=0 is referred to as triacetyl cellulose (TAC), while one under the condition of B>0 is referred to as cellulose-mixed fatty acid ester. TAC is preferred in the invention.

The TAC satisfies the following conditions (V) and (VI):

$$2.6 \leq A \leq 3.0, \text{ and} \quad (V)$$

$$0=B. \quad (VI)$$

The cellulose-mixed fatty acid ester has not only an acetyl group but also an acyl group having 3 to 5 carbon atoms. Preferred examples of the acyl group having 3 to 5 carbon atoms include propionyl ($C_2H_5CO$—), butyryl (n- or iso- $C_3H_7CO$—) and valeryl (n-, iso-, sec- or tert- $C_4H_9CO$—). A particularly preferred group is n-propionyl.

If these acyl groups are introduced with acylating agents such as acid anhydrides and acid chlorides, an organic acid (such as acetic acid) or methylene chloride is used as an organic solvent (reaction medium). In the reaction, a protic catalyst such as sulfuric acid is preferably used. If the acylating agent is an acid chloride (e.g., $CH_3CH_2COCl$), a basic compound is used. In a normal industrial process of acylation, cellulose is acylated in a mixed organic medium comprising a fatty acid (e.g., acetic acid, propionic acid, butyric acid, valeric acid) or an acid anhydride thereof (e.g., acetic acid anhydride, propionic acid anhydride, butyric acid anhydride, valeric acid anhydride) that corresponds to the aimed acetyl or other acyl groups. The process is concretely described in, for example, Japanese Patent Provisional Publication No. 10(1998)-45804.

The cellulose acylate used in the invention has a (viscosity average) polymerization degree preferably in the range of 200 to 700, more preferably in the range of 250 to 550, further preferably in the range of 250 to 350. A film produced from the cellulose acylate having a polymerization degree in the above range has a satisfying mechanical strength. For determining the viscosity average polymerization degree (DP), the intrinsic viscosity [η] of the cellulose acylate is measured by means of an Ostwald viscometer. From the measured viscosity [η], the viscosity average polymerization degree is calculated according to the formula:

$$DP=[\eta]/Km$$

in which DP is a viscosity average polymerization degree, and Km is the constant of $6 \times 10^{-4}$.

In the invention, cellulose acylate is dissolved in a mixed solvent composed of the main solvent essentially consisting of non-chlorine-containing solvent and the auxiliary solvent of alcohol, to prepare a dope. The dope is then cast to form a film.

Here, the terms "the mixed solvent essentially consisting of non-chlorine-containing solvent" mean that the mixed solvent contains 0 to 40 wt. %, preferably 0 to 15 wt. %, more. preferably 0 wt. % of a solvent having one or more chlorine atoms in its molecular structure. Examples of the solvent having one or more chlorine atoms in its molecular structure include halogenated hydrocarbons having 1 to 7 carbon atoms such as dichloromethane, dichloroethane and chlorobenzene.

The non-chlorine-containing solvent (which is contained in the main solvent in an amount of 60 to 100 wt. %, preferably 85 to 100 wt. %, more preferably 100 wt. %) comprises an ester and a ketone. The ester has a solubility parameter of 16 to 23. The ketone has a solubility parameter of 16 to 23. The mixed solvent comprises the ester in an amount of 58 to 96 wt. % and the ketone in an amount of 2 to 15 wt. %.

The solubility parameter is a value defined by the formula: $(\Delta H/V)^{1/2}$ in which $\Delta H$ and V are a molar heat of vaporization and a molar volume of the aimed solvent, respectively. The less different solubility parameters the solvents have, the more they are mixed.

The solubility parameter is described in many publications (for example, "Polymer Handbook (fourth edition)", by J. Brandrup et. al., VII/671 to VII/714).

The ester may have a straight chain structure, a branched structure or a cyclic structure. The ester can have another functional group (such as, —O—, —CO— and —OH) in addition to the ester bond (—COO—). two or more of the above functional groups may be used.

The ester preferably has 3 to 12 carbon atoms. The ester also preferably has a boiling point of 250° C. or below. Examples of the esters include ethyl formate (solubility parameter: 19.2), propyl formate (18.4), n-pentyl formate (18.1), methyl acetate (19.6), ethyl acetate (18.2) and n-pentyl acetate (17.6). Two or more esters can be used in combination.

The mixed solvent comprises the ester preferably in an amount of 60 to 94 wt. %, more preferably in an amount of 66 to 93 wt. %, and most preferably in an amount of 68 to 92 wt. %.

The ketone may have a straight chain structure, a branched structure or a cyclic structure. The ketone can have another functional group (such as, —O— and —OH) in addition to the carbonyl bond (—CO—).

The ketone preferably has 3 to 12 carbon atoms, and more preferably has 4 to 12 carbon atoms. The ketone also preferably has a boiling point of 250° C. or below. Examples of the ketones include acetone (solubility parameter:20.3), methyl ethyl ketone (19.0), diethyl ketone (18.2), diisobutyl ketone (18.0), cyclopentanone (20.9), cyclohexane (20.3), and methyl cyclohexanone (20.1). Methyl ethyl ketone, diethyl ketone, methyl isobutyl ketone, cyclopentanone are preferred. Two or more ketones can be used in combination.

The mixed solvent comprises the ketone preferably in an amount of 3 to 15 wt. %, more preferably in an amount of 3 to 12 wt. %, and most preferably in an amount of 3 to 10 wt. %.

The main solvent can further comprise an ether in addition to the ester and the ketone. The ether preferably has a solubility parameter of 16 to 23. The ether may have a straight chain structure, a branched structure or a cyclic structure. The ester can have another functional group in addition to the ether bond (—O—).

The ether preferably has 3 to 12 carbon atoms. The ether also preferably has a boiling point of 250° C. or below. Examples of the ethers include dibutyl ether-(solubility parameter: 16.0), dimethoxy methane (24.0), dimethoxy ethane (23.3), 1,4-dioxane (19.6), 1,3-dioxolan (19.8), tertahydrofuran (19.4), anisole (19.4) and phenetole (18.9). The main solvent can further comprise a solvent having two or more of the functional groups (—O—, —CO— and —COO—). Examples of the solvent include ethyl 2-ethoxyacetate (20.2), 2-methoxy ethanol (23.3), 2-butoxy ethanol (19.4), 1,2-diacetoxy acetone (21,2) and acetyl acetone (21.6).

The mixed solvent further comprises an alcohol in an amount of 2 to 40 wt. % in addition to the main solvent. The alcohol is preferably a mono-hydric or di-hydric alcohol having 1 to 8 carbon atoms. The alcohol has a solubility parameter of 20 to 30. The alcohol preferably has a boiling point of 250° C. or below. Examples of the alcohols include methanol (solubility parameter:29.7), ethanol (26.0), 1-propanol (24.3), 2-propanol (23.3), 1-butanol (23.3), 2-butanol (22.6), tert-butanol (21.7), 1-pentanol (21.4), 2-methyl-2-butanol (21.1) and cyclohexanol (23.3). Two or more alcohols can be used in combination.

The mixed solvent comprises the alcohols preferably in an amount of 3 to 30 wt. %, more preferably in an amount of 4 to 25 wt. %, and most preferably in an amount of 5 to 22 wt. %.

The solvents may be selected in consideration of oxygen mass fraction as well as the solubility parameter. The oxygen fraction is the molecular weight of oxygen per that of the solvent, and hence indicates the content of oxygen contained in the solvent.

Cellulose acylate generally has hydroxyls, ether bondings, ester bondings and carbonyl groups. The inventors have found that the solubility of cellulose acylate greatly depends on the oxygen fraction of solvent. If the solvent has an oxygen mass fraction in the range of 0.1 to 0.6, it has enough affinity with the cellulose acylate to dissolve well.

Examples of the oxygen mass fraction of solvent are as follows: dibutyl ether (oxygen mass fraction: 0.12), dimethoxy methane (0.42), dimethoxy ethane (0.36), 1,4-dioxane (0.36), 1,3,5-trioxane (0.53), 1,3-dioxolan (0.36), tetrahydrofuran (0.22), anisole (0.15), phenetole (0.13), acetone (0.28), methyl ethyl ketone (0.22), diethyl ketone (0.18), diisobutyl ketone (0.11), cyclopentanone (0.19), cyclohexanone (0.16), methylcyclohexanone (0.14) ethyl formate (0.53), propyl formate (0.36), n-pentyl formate (0.27), methyl acetate (0.43), ethyl acetate (0.36) ethyl propionate (0.31), ethyl 2-ethoxyacetate (0.40), 2-methoxyethanol (0.42), 2-butoxyethanol (0.27), acetyl acetone (0.32), methanol (0.50), ethanol (0.35), 1-propanol (0.27), 2-propanol (0.27) 1-butanol (0.22), 2-butanol (0.22), tert-butanol (0.22), 1-pentanol (0.17), 2-methyl-2-butanol (0.17), and cyclohexanol (0.19).

The main solvent preferably comprises a solvent having cyclic structure in an amount of 5 wt. % or more. In consideration of drying after the film is formed, the solvent preferably has 3 to 12 carbon atoms. However, it by no means restricts the invention.

Examples of such ether include propylene oxide, 1,2-epoxybutane, 1,4-dioxane, 1,3-dioxolan, 1,3,5-trioxane, tetrahydrofuran, and furan.

Examples of such ketone include cyclobutanone, cyclopentanone, methyl cyclohexanone, 1,4-cyclohexanedione, isophorone, and camphor.

Examples of such ester include γ-butyrolactone, ethylene carbonate and cyclohexyl acetate.

Examples of other solvents include 2-pyrrolidone, N-methylpyrrolidone, piperidine, ε-caprolactam, tetrahydrothiophene, and 1.3-propanesulfone.

Further, organic solvents having two or more cyclic structures can be also used.

Examples of preferred composition of the dope are as follows:
cellulose acylate/methyl acetate/cyclohexanone/methanol/ethanol (X/(70-X)/20/5/5, by weight);
cellulose acylate/methyl acetate/methyl ethyl ketone/acetone/methanol/ethanol (X/(50-X)/20/20/5/5, by weight);
cellulose acylate/acetone/methyl acetoacetate/ethanol (X/(75-X)/20/5, by weight);
cellulose acylate/methyl acetate/1,3-dioxolan/methanol/ethanol (X/(70-X)/20/5/5, by weight);
cellulose acylate/methyl acetate/dioxane/acetone/methanol/1-butanol (X/(60-X)/20/12/5/3, by weight);
cellulose acylate/acetone/cyclopentanone/methanol/ethanol (X/(60-X)/30/5/5, by weight); and
cellulose acylate/1,3-dioxolan/cyclohexanone/methyl ethyl ketone/methanol/ethanol (X/(55-X)/20/10/5/5/5, by weight).

In the above, X represents weight parts of cellulose acylate, and is preferably in the range of 10 to 25, more preferably in the range of 15 to 23.

A fluorine-containing alcohol having 2 to 10 carbon atoms may be contained in an amount of 10 wt. % or less based on the total weight of all the used solvents. Examples of the fluorine-containing alcohol include 2-fluoroethanol, 2,2,2-trifluoroethanol, and 2,2,3,3-tetrafluoro-1-propanol.

Further, an aromatic or aliphatic hydrocarbon having 5 to 10 carbon atoms may be contained in an amount of 10 wt. % or less. Examples of the hydrocarbon include cyclohexane, hexane, benzene, toluene, and xylene.

When cellulose acylate is dissolved in the mixed solvent in a container, the container may be filled with inert gas such as nitrogen gas. The prepared cellulose acylate solution (dope) must be viscous enough to form a film when cast on a support. The viscosity of the dope immediately before casting is normally in the range of 10 to 2,000 ps·s, preferably in the range of 30 to 400 ps·s.

The cellulose acetate solution can be prepared according to the conventional method, in which cellulose acetate is added and stirred in the mixed solvent in a tank at room temperature. For quickly dissolving cellulose acetate, the cooling dissolution method and/or the high-temperature dissolution method may be adopted.

At the first stage of the cooling dissolution method, cellulose acylate is gradually added to organic solvent and stirred at room temperature (−10 to 55° C.) to swell. If two or more solvents are used, there is no restriction on the order of addition. For example, after cellulose acylate is added into the main solvent, other solvents (e.g., alcohol as gelling solvent) may be used. Otherwise, in contrast, cellulose acylate beforehand wetted with the gelling solvent may be added into the main solvent. If so, cellulose acylate is homogeneously dissolved.

For example, cellulose triacetate is gradually added and stirred in a mixture of methyl acetate and a ketone having 4 to 12 carbon atoms at a temperature of −10 to 55° C. Otherwise, it may be beforehand swollen with methyl acetate alone, and then mixed with a ketone having 4 to 12 carbon atoms to prepare a homogeneous slurry. Further, after mixing methyl acetoacetate or ethyl acetoacetate and cellulose acetate, methyl acetate may be added to the mixture. Cellulose acetate is insufficiently swollen with methyl acetate alone, but the inventors have found that it can be swollen well or almost dissolved if the ketone having 4 to 12 carbon atoms is cooperatively used.

The amount of cellulose acylate in the prepared mixture or slurry is preferably in the range of 10 to 40 wt. %, more preferably in the range of 10 to 30 wt. %. The mixture may contain desired additives described below.

The prepared mixture or slurry is then cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). The cooling rate is preferably as fast as possible, and concretely 100° C./second or more. The cooling procedure is preferably carried out in a sealed vessel to prevent contamination of water, which is caused by dew condensation.

The cooled mixture is then warmed to a temperature of 0 to 200° C. (preferably 0 to 150° C., more preferably 0 to 120° C., and most preferably 0 to 50° C.) to obtain a liquid containing fluid cellulose acylate in organic solvent. For warming, the mixture is left at room temperature or on a hot bath.

The time for the cooling and warming stages can be shortened by conducting the cooling procedure at a high pressure and by conducting the warming procedure at a low pressure. A pressure vessel is preferably used at a high or low pressure.

The cooling and warming procedures may be carried out once or repeated twice or more.

Also at the first stage of the high-temperature dissolution method, cellulose acylate is swollen in the same manner as the cooling dissolution method. The amount of cellulose acylate is preferably in the range of 5 to 30 wt. %, more preferably in the range of 15 to 30 wt. %, further preferably in the range of 17 to 25 wt. %.

Cellulose acylate and the mixed solvent are placed in a pressure vessel and then heated to 70 to 240° C., preferably 80 to 220° C., more preferably 100 to 200° C., most preferably 100 to 190° C. under a pressure of 0.2 to 30 MPa.

The mixture is then cooled to a temperature below the lowest boiling point of the used solvents, normally to a temperature of −10 to 50° C. Thus, the pressure in the vessel is reduced to atmospheric pressure. For cooling, the mixture may be left at room temperature or cooled with cooling medium such as water.

The cooling and warming procedures may be carried out once or repeated twice or more.

The cellulose acylate solution. (dope) can contain additives such as plasticizer. As the plasticizer, phosphoric esters, carboxylic esters and glycolic esters are usually used.

Examples of the phosphoric esters include triphenyl phosphate (TPP), tricresyl phosphate (TCP), cresyl diphenyl phosphate, octyl diphenyl phosphate, diphenyl biphenyl phosphate, trioctyl phosphate and tributyl phosphate. Examples of the carboxylic esters include phthalic esters and citric esters. Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetyl citrate (OACTE) and tributyl o-acetyl citrate (OACTB), acetyl triethyl citrate, and acetyl tributyl citrate.

Examples of the carboxylic esters further include butyl oleate, methylacetyl ricinoleate, dibutyl sebacate and various trimellitic esters.

Examples of the glycolic esters include triacetin, tributyrin, butylphthalyl butyl glycolate, ethylphthalyl ethyl glycolate, and methylphthalyl ethyl glycolate.

Preferred plasticizers are triphenyl phosphate, tricresyl phosphate, cresyl diphenyl phosphate, tributyl phosphate, dimethyl phthalate, diethyl phthalate, dibutyl phthalate, dioctyl phthalate, diethylhexyl phthalate, triacetin, and ethylphthalyl ethyl glycolate. Further, triphenyl phosphate, diethyl phthalate and ethylphthalyl ethyl glycolate are particularly preferred.

These compounds may be used singly or in combination with two or more. The amount of plasticizer is preferably in the range of 5 to 30 wt. %, more preferably in the range of 8 to 16 wt. % based on the amount of the cellulose acylate. The plasticizer may be added together with cellulose acylate and the solvent in preparing the cellulose acylate solution, or otherwise they may be added after the solution is prepared.

As a plasticizer reducing optical anisotropy, (di) pentaerythritol esters (described in Japanese Patent Provisional Publication No. 11(1999)-124445), glycerol esters (described in Japanese Patent Provisional Publication No. 11(1999)-246704), diglycerol esters (described in Japanese Patent Provisional Publication No. 2000-63560), citric esters (described in Japanese Patent Provisional Publication No. 11(1999)-92574) and substituted phenylphosphoric esters (described in Japanese Patent Provisional Publication No. 11(1999)-90946) are preferably used.

As a releasing agent, citric acid, oxalic acid, tartaric acid, aspartic acid, chloroacetic acid, 4-methylphthalic acid, $C_{12}H_{25}OCH_2CH_2O-P(=O)-(OK)_2$, $C_{12}H_{25}OSO_3Na$ and $\{C_{12}H_{25}O(CH_2CH_2O)_5\}_2-P(=O)-OH$ are preferably used.

Deterioration inhibitors (e.g., antioxidizing agent, peroxide decomposer, radical inhibitor, metal inactivating agent, oxygen scavenger, amine) and/or ultraviolet (UV) absorber can be incorporated in the dope. The deterioration inhibitors and UV absorber are described in Japanese Patent Provisional Publication Nos. 3(1991)-199201, 5(1993)-1907073, 5(1993)-194789, 5(1993)-271471, 6(1994)-107854, 6(1994)-118233, 6(1994)-148430, 7(1995)-11056, 8(1996)-29619, 8(1996)-239509 and 7(1995)-11056.

A preferred deterioration inhibitor is butyrated hydroxytoluene (BHT). The deterioration inhibitor is preferably added in the range of 0.01 to 1 wt. %, and more preferably in the range of 0.01 to 0.2 wt. % based on the amount of the prepared solution (dope).

As the UV absorber, hindered phenols are preferably used. Examples of the hindered phenols include 2,6-di-tert-butyl-p-cresol, pentaerythrityl-tetrakis[3-(3,5-di-tert-butyl-4-hydroxyphenyl)propionate], triethyleneglycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylene bis(3,5-di-tert-butyl-4-hydroxyhydroxyamide), 1,3,5-trimethyl-2,4,6-tris(3,5-di-tert-butyl-4-hydroxybenzyl)benzene, and tris-(3,5-di-tert-butyl-4-hydroxybenzyl)-isocyanate. Among them, 2,6-di-tert-butyl-p-cresol, pentaerythrityl-tetrakis[3-(3,5-di-tert-butyl-4-hydroxyphenyl)propionate] and trieth-yleneglycol-bis[3-(3-tert-butyl-5-methyl-4-hydroxyphenyl)propionate] are particularly preferred. Metal inactivating agent of hydrazine type (e.g., N,N'-bis[3-(3,5-di-tert-butyl-4-hydroxyphenyl) propionyl]-hydrazine) and/or processing stabilizer (e.g., tris (2,4-di-tert-butylphenyl)phosphate) may be used together with the UV absorber. The amount of UV absorber is preferably in the range of 1 ppm to 1.0 wt. %, more preferably in the range of 10 to 1,000 ppm by weight, based on the amount of cellulose acylate.

Further, colorant may be incorporated preferably in an amount of 10 to 1,000 ppm, more preferably in an amount of 50 to 500 ppm by weight, based on the amount of cellulose acylate.

It is also preferred to incorporate inorganic fine particles (e.g., kaolin, talc, diatomaceous earth, quartz powder, calcium carbonate, barium sulfate, titanium oxide and alumina), salts of alkaline earth metal (e.g., calcium, magnesium) serving as thermo stabilizer, antistatic agents, flame retarders, lubricants and/or oils.

Thus, the cellulose acylate solution (dope) is prepared. It is preferred to dissolve cellulose acylate so that the following conditions may be satisfied.

(1) The prepared solution has a square radius of inertia in the range of 40 to 200 nm, preferably in the range of 45 to 170 nm, more preferably in the range of 50 to 150 nm. In the conventional dissolution method, polymer molecules such as cellulose acylate molecules are completely dissolved. In contrast, however, the present invention is characterized by aggregating the cellulose acylate molecules to increase the square radius of inertia. The cellulose acylate molecules are intentionally aggregated to form fine nuclei, and thereby the molecules are prevented from forming large aggregates (viscous lumps) that often stuffs a filter up or causes tailing troubles in the casting procedure. A cellulose acylate solution prepared by the conventional dissolution method generally has a square radius of inertia in the range of 10 to 20 nm.

(2) The prepared solution has a second virial co-efficient in the range of $-2 \times 10^{-4}$ to $4 \times 10^{-4}$, preferably $-1.5 \times 10^{-4}$ to $3 \times 10^{-4}$, more preferably $-1.0 \times 10^{-4}$ to $2.5 \times 10^{-4}$. The second virial coefficient indicates affinity between polymer and solvent. If it is a positive value, a large absolute value means high affinity. If it is a negative value, a large absolute value means low affinity. The solution in which the polymer is completely dissolved has a second virial coefficient of $8 \times 10^{-4}$ or more, and the polymer molecules expand their molecular chains in the solution. Accordingly, that solution is so viscous that lumps are often formed to cause the trouble of tailing and that the tailing is hardly cancelled even by leveling the applied solution. On the other hand, in the solution having a second virial coefficient in the above range, the polymer molecules compactly fold their chains up, so that the solution is not viscous. As a result, it is easy to cancel the tailing and hence to apply the solution evenly on a support.

(3) The dissolved cellulose acylate has a weight average molecular weight measured by the photo-scattering method in the range of 300,000 to 4,000,000, preferably in the range of 400,000 to 2,000,000, more preferably in the range of 500,000 to 1,200,000. Since the molecular weight is measured without applying external force to the sample in the photo-scattering method, the obtained molecular weight indicates aggregation of the polymer. [In contrast, in GPC (gel permeation chromatography) method, the molecular weight is measured while shearing force is being applied in a column. Accordingly, the obtained molecular weight indicates that of each single molecule.] The cellulose acylate dissolved in the solution of the invention has a molecular weight measured by the GPC method in the range of 50,000 to 180,000. The fact that the weight average molecular weight by the photo-scattering method is much larger than that by the GPC method means the cellulose acylate forms aggregates.

Owing to the aggregates, the film formed on a support of casting machine is easily peeled off. The process for forming a cellulose acylate film according to the solvent cast method comprises the steps of casting a cellulose acylate solution onto the support (band or drum), evaporating the solvent of solution, peeling the formed film from the support, and drying the film. If the solution mainly comprises non-aggregated cellulose acylate, the molecules of cellulose acylate are solvated. The solvating molecules are relatively combined well, and accordingly it takes relatively long time to evaporate the solvent. As a result, the time for producing the film cannot be shortened. On the other hand, if the solution mainly comprises aggregated cellulose acylate, the molecules of cellulose acylate are not solvated. Accordingly, the solvent is so efficiently evaporated that the time for producing the film can be shortened.

(4) Cellulose acylate is dissolved so that the heat of dissolution may be in the range of 100 to 900 J/g, preferably in the range of 200 to 800 J/g, more preferably in the range of 300 to 700 J/g. If it is dissolved in the normal manner, the heat of dissolution is in the range of 20 to 30 J/g. In the invention, when the aggregates of cellulose acylate are formed (as described in (1)), the heat is generated. Cellulose acylate is dissolved so that the heat of dissolution may be in the above range, and thereby the prepared solution is prevented from forming viscous lumps.

(5) Cellulose acylate is dissolved so that the reduced viscosity may be in the range of 0.1 to 0.3, preferably in the range of 0.12 to 0.27, more preferably 0.14 to 0.24. The solution in which cellulose acylate is well dissolved in the normal manner has a reduced viscosity of 0.5 or more, but the solution of the invention comprising cellulose acylate molecules compactly folding their chains up (as described in (2)) has a reduced viscosity in the above range. That solution is effectively prevented from causing the tailing.

The cellulose acylate solution satisfying the above conditions can be prepared in the following manner. The inventors have found that it is important to control water and iron contents so as not to inhibit the aggregation of cellulose acylate.

(1) The iron content in cellulose acylate is beforehand controlled in the range of 0 to 50 ppm, preferably in the range of 0 to 30 ppm, more preferably in the range of 0 to 20 ppm. For preparing the cellulose acylate containing that content of iron, the reaction mixture in the final step of acylating cellulose is stirred well in a mixed solvent of acetone/water (0.2/0.8 to 0.8/0.2) at a temperature of 30° C. to 70° C. (preferably 35° C. to 65° C., more preferably 40° C. to 60° C.) for 30 minutes to 3 hours (preferably 40 minutes to 2.5 hours, more preferably 50 minutes to 2 hours). In that step, prepared cellulose acylate is swollen with acetone to wash away iron positioned even in internal position. This washing is carried out once or repeated five times or less, and is preferably repeated twice to five times, more preferably repeated twice to four times. Thus-treated cellulose acylate is filtered and dried, and then dissolved.

(2) Before dissolving, the water content of cellulose acylate is controlled in the range of 0 to 0.5%, preferably 0 to 0.3%, more preferably 0 to 0.2%. For controlling the water content in that range, the cellulose acylate is dried at a temperature of 80° C. to 200° C. (preferably 100° C. to 180° C., more preferably 110° C. to 160° C.) for 10 minutes to 10 hours (preferably 20 minutes to 8 hours, more preferably 30 minutes to 5 hours). The drying procedure may be carried out in the atmosphere or in vacuo. The drying in vacuo is more effective than that in the atmosphere.

(3) Cellulose acylate is dissolved under dry air atmosphere or under inert gas atmosphere, so as to reduce the amount of water vapor coming into the solution and thereby to reduce the water content in the solution.

Thus prepared dope is cast and dried to form the film. The dope may be beforehand concentrated so that the cast dope may be easily dried.

There is no particular restriction on a method for concentrating the dope, and for example the following methods can be adopted.

(1) A cylindrical container equipped with a stirring propeller rotating around the inside wall is used. The low-concentrated solution is charged between the inside wall and the locus of tips of the propeller, and heated to evaporate the solvent. Thus, the concentrated solution is prepared. (This method is described, for example, in Japanese Patent Provisional Publication No. 4(1992)-259511.)

(2) The low-concentrated solution is heated, and sprayed from a nozzle into a container. While the sprayed solution is flying from the nozzle to the inside wall of the container, the solvent is flashily evaporated and exhausted is discharged from the bottom of the container. (This method is described, for example, in U.S. Pat. Nos. 2,541,012, 2,858,229, 4,414,341 and 4,504,355.)

For forming the cellulose acylate film of the invention, known methods and apparatuses used for preparing a conventional film can be used.

The dope having a solid content of 10 to 40% is prepared in a dissolving vessel (pot), discharged from the vessel, filtrated through a proper filter (e.g., metal net, flannel) to remove foreign substances (e.g., unsolved matter, dust, impurities), and then stored in a tank for a while to remove bubbles. From the storing tank, the dope is sent to a casting zone by means of, for example, a constant-pressure gear pump, which can send the dope in an amount precisely controlled by rotation of the gear.

The dope can be cast according to, for example, the following method:

(1) the dope is evenly extruded from a pressure-die onto the support, (2) the dope cast on the support is leveled by means of a doctor blade to control the thickness of the formed film, or (3) the thickness of the formed film is controlled by means of a reverse roll coater.

The method (1) is preferred. The pressure-die may be either coat-hanger type or T-die type, and is placed above the support.

Two or more pressure-dies may be used to cast two or more dopes cooperatively, for example, in the following manner.

(1) The solutions may be cast from nozzles provided at intervals in the transferring direction of the support to form a layered film. The process is concretely described in, for example, Japanese Patent Provisional Publication Nos. 61(1986)-158414, 1(1989)-122419 and 11(1999)-198285.

(2) The solutions may be simultaneously cast from two nozzles to form a layered film. This method is described in, for example, Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933.

(3) The method described in Japanese Patent Provisional Publication No. 56(1981)-162617 can be also adopted. In that method, a highly viscous cellulose acylate solution is enclosed with a low viscous one, and then the thus-combined solutions are simultaneously extruded and cast.

(4) Further, the method described in, for example, Japanese Patent Publication No. 44(1969)-20235 may be adopted. In the method, a film is beforehand formed from a solution extruded out of one of two nozzles. After the formed film is peeled and reversely placed on the support, another solution is extruded from the other nozzle to cast onto the film (on the surface having faced to the support) to form a layered film.

The cellulose acylate solutions may be the same or different from each other. Further, they may be cast together with dopes for other functional layers (e.g., adhesive layer, dye layer, antistatic layer, anti-halation layer, ultraviolet-absorbing layer, polarizing layer).

The dope is evenly cast on a support (endlessly running band or drum). The surface of the drum or band is preferably polished to give a mirror plane. For example, a drum having chromium-plated mirror surface or a band of stainless steel having polished mirror surface is preferably used. The drum or band preferably has a surface temperature of not higher than 10° C.

The dope is cast while the support is circularly running. When the support turns around once and returns to the initial position, the film of half-dried dope (referred to as "web") is peeled off. In this stage, it is important to control the amount of remaining solvent. If an excess amount of the solvent remains near the surface of the support, the dope remains when the web is peeled. The remaining dope hinders the next casting. Further, if the solvent remains too much, the web cannot have enough mechanical strength to be peeled off. The amount of remaining solvent depends upon how to dry the web on the drum or band. Heating the back (bottom) face of the drum or band can reduce the remaining solvent more effectively than blowing air onto the dope.

In order to dry the dope, various methods can be adopted. For example, hot air may be blown onto the surface of the dope or onto the back (bottom) surface (which is opposite to the surface on which the dope is cast) of the drum or band so that the dope may be heated by conduction of heat. Otherwise, the back (bottom) face of the drum or band may be contacted with liquid whose temperature is controlled, and thereby the temperature of the dope can be controlled by conduction of heat (liquid heat-conduction method). The liquid heat-conduction method is preferred.

Before the dope is cast, the support may have any surface temperature as long as it is below the boiling point of the solvent of the dope. However, in order to promote drying and to reduce the fluidity of dope, the surface temperature is preferably lower than the lowest boiling point of the solvent component by 1 to 10° C. The dope is dried at a temperature of preferably 40 to 250° C., more preferably 70 to 180° C. Preferably, the dope is further dried with hot air to remove the solvent remaining in the film. It is preferred to elevate the temperature of the hot air gradually from 50 to 160° C. This method is described in Japanese Patent Publication No. 5(1993)-17844. According to the method, the time for casting and peeling steps can be shortened. The conditions such as the drying temperature, the amount of drying air and the time for drying are properly selected according to the kinds and combination of used solvent components. The amount of the solvent remaining in the resultant film is preferably 2 wt. % or less, more preferably 0.4 wt. % or less, so that the film may have excellent size-stability.

After peeled from the support, the web is dried again. In this drying, the film is liable to shrink laterally. The higher the drying temperature is, the more the web shrinks. It is preferred to dry the web while the web is inhibited from shrinking as much as possible, to ensure the planeness of the resultant film. From this viewpoint, the drying method described in Japanese Patent Provisional Publication No. 62(1987)-46625 (tenter method) is preferred. In the method, both sides of the web are clipped to keep the width with a tenter during the whole or a part of drying procedure.

It is also preferred to laterally stretch the dried web (film) intentionally. For example, the methods described in Japanese Patent Provisional Publication Nos. 62(1987)-115035, 4(1992)-152125, 4(1992)-284211, 4(1992)-298310 and 11(1999)-48271 can be adopted. The retardation in the plane of the film can be controlled by stretching, which increases the retardation value of the film.

The stretching is performed at room temperature or an elevated temperature. The elevated temperature is preferably below the glass transition temperature of the film. The film may be stretched either uniaxially or biaxially. The film can be stretched while dried in the film production. Preferably, the film is stretched while the solvent still remains in the film. The stretching can be performed, for example, by controlling the conveying rollers so that the speed of winding up the film may be faster than that of peeling the film. Otherwise, the stretching may be performed by gradually widening the interval between tenters clipping both sides of the conveyed film. Further, after the film is dried, it can be uniaxially stretched by means of a stretching machine.

The expanding ratio of stretching (the ratio of length increased by stretching based on the original length) is in the range of 10 to 30%.

The steps from casting to drying may be performed under air atmosphere or relatively inert atmosphere (e.g., nitrogen gas atmosphere).

For winding up the film, generally used machines can be used. Examples of the winding method include constant tension method, constant torque method, taper tension method, and programmed tension control method by which inner stress is kept constant.

The thickness of the resultant (dried) cellulose acylate film depends upon what the film is used for, but is normally in the range of 5 to 500 $\mu$m, preferably in the range of 40 to 250 $\mu$m, more preferably in the range of 30 to 150 $\mu$m. For controlling the thickness, various conditions such as the solid content of the dope, the slit gap of the die, the extruding pressure and the transferring speed of the support are properly adjusted.

Various known film-forming methods other than those described above can be adopted. They are, for example, described in Japanese Patent Provisional Publication Nos. 61(1986)-94724, 61(1986)-148013, 4(1992)-85011, 4(1992)-286611, 5(1993)-185443, 5(1993)-185445, 6(1994)-278149 and 8(1996)-207210. In each method, various conditions are determined in consideration of boiling points of the used solvent components.

After the cellulose acylate film is formed, auxiliary layers such as undercoating layer, antistatic layer, anti-halation layer and protective layer may be provided thereon by coating.

The thus-prepared cellulose acylate film of the invention can be used in the following optical elements.

(1) Optical Compensatory Sheet of Liquid Crystal Display

The cellulose acylate film of the invention can be advantageously used as an optical compensatory sheet of liquid crystal display. The film can work by itself as the optical compensatory sheet. In that case, the film is preferably placed so that the slow axis of the film may be parallel or perpendicular to the transmission axis of polarizing element (described below). The placement of the compensatory sheet and the polarizing element is described in Japanese Patent Provisional Publication No. 10(1998)-48420.

A liquid crystal display comprises a pair of polarizing elements, a liquid crystal cell provided between the elements, and at least one optical compensatory sheet placed between the cell and the element. The liquid crystal cell comprises a pair of electrode substrates and liquid crystal placed between the substrates.

For forming the layer of liquid crystal in the cell, one or more spacers are placed between the substrates to ensure a gap, to which the liquid crystal is injected and sealed. The electrode substrate comprises a substrate and a transparent electrode layer formed thereon. The transparent electrode layer is a transparent membrane containing an electroconductive material. In the liquid crystal cell, various other layers such as gas-barrier layer, hard-coating layer and undercoating layer (for adhering the transparent electrode layer) may be provided. These layers are normally provided on the substrate. The substrate normally has a thickness of 80 to 500 $\mu$m.

The optical compensatory sheet is a birefringencial film for removing undesired coloring of displayed image. The cellulose acylate film of the invention can serve by itself as the optical compensatory sheet. Further, the film of the invention may be laminated on a film having the opposite birefringence, to prepare another optical compensatory sheet for enlarging the viewing angle of liquid crystal display. Here, the term "film having the opposite birefringence" means a film having positive or negative birefringence if the film of the invention has negative or positive birefringence, respectively. The thickness of the optical compensatory sheet is preferably the same as that described above for the film of the invention.

The polarizing element comprises a polarizing membrane. Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The thickness of the membrane is preferably in the range of 25 to 350 $\mu$m, more preferably in the range of 50 to 200 $\mu$m. The liquid crystal display may have a surface-treatment membrane, which serves as, for example, hard-coating layer, anti-fogging layer, anti-glare layer and anti-reflection layer. An optical compensatory sheet comprising a support and a thereon-provided optically anisotropic layer containing liquid crystal (particularly, disotic liquid crystal) is proposed in, for example, Japanese Patent Provisional Publication Nos. 3(1991)-9325, 6(1994)-148429, 8(1996)-50206 and 9(1997)-26572. The cellulose acylate film of the invention can be used as a support of that compensatory sheet.

(2) Optically Anisotropic Layer Containing Disotic Liquid Crystal Molecules

The optically anisotropic layer is preferably a negative uniaxial layer in which disotic liquid crystal molecules are oriented in inclined alignment. The angle between the disc plane of each molecule and the support plane preferably changes according to the depth of the molecules. In other wards, the molecules are preferably oriented in hybrid alignment. The optical axis of each molecule is parallel to the normal of the disc plane. The disotic liquid crystal molecule shows larger birefringence in the disc plane than along the optical axis. The disotic liquid crystal molecules may be aligned essentially parallel to the support surface.

(3) Liquid Crystal Display (LCD) of VA Mode

The cellulose acylate film of the invention is particularly preferably used as a support of an optical compensatory sheet for liquid crystal display (LCD) of VA mode, which comprises a liquid crystal cell of VA mode. In the compensatory sheet for LCD of VA mode, the minimum absolute value of retardation is preferably given neither in the plane of the compensatory sheet nor along the normal. The optical characters of the compensatory sheet for VA mode LCD depend upon those of the optically anisotropic layer, those of the support, and arrangement of the anisotropic layer and the support. If two compensatory sheets are used in VA mode LCD, the retardation in the planes of the sheets is preferably controlled in the range of −5 to 5 nm. Accordingly, each compensatory sheet has an absolute value of retardation in the plane in the range of 0 to 5. If one compensatory sheet is used, the retardation in the plane of the sheet is preferably controlled in the range of −10 to 10 nm.

(4) Liquid Crystal Display (LCD) of OCB or HAN Mode

The cellulose acylate film of the invention is also advantageously used as a support of an optical compensatory sheet for LCD of OCB mode (which comprises a liquid crystal cell of OCB mode) or LCD of HAN mode (which comprises a liquid crystal cell of HAN mode). In the compensatory sheet for LCD of OCB or HAN mode, the minimum absolute value of retardation is preferably given neither in the plane of the compensatory sheet nor along the normal. The optical characters of the compensatory sheet for OCB or HAN mode LCD also depend upon those of the optically anisotropic layer, those of the support, and arrangement of the anisotropic layer and the support.

(5) Liquid Crystal Display (LCD) of Other Mode

The cellulose acylate film of the invention is still also advantageously used as a support of an optical compensatory sheet for LCD of ASM (axially symmetric aligned microcell) mode, which comprises a liquid crystal cell of ASM mode. The liquid crystal cell of ASM mode is characterized by that the thickness of cell is kept with position-controllable resin spacers. Other characters of the ASM mode cell are the same as those of TN mode liquid crystal cell. The cell and LCD of ASM mode are described in, for example, Kume et al., SID98 Digest 1089(1998).

Further, the cellulose acylate film of the invention is advantageously used as a support of an optical compensatory sheet for LCD of TN mode, which comprises a liquid crystal cell of TN mode. The cell and LCD of TN mode have been known well, and are described in, for example, Japanese Patent Provisional Publication Nos. 3(1991)-9325, 6(1994)-148429, 8(1996)-50206 and 9(1997)-26572.

[Evaluations of Cellulose Acylate, Solution and Film in Examples]

In each of the following Examples, the chemical and physical properties of cellulose acylate, solution and film thereof are evaluated in the following manner.

(1) Acetic Acid Content of Cellulose Acylate (%)

The acetic acid content was measured according to the saponificaton method. The sample cellulose acylate was dried and precisely weighed, and dissolved in a mixed solvent of acetone and dimethyl sulfoxide (4:1, by volume). After the corresponding amount of 1-N NaOH aqueous solution was added, the solution was left at 25° C. for 2 hours to saponify the sample. Phenolphthalein as an indicator was added to the solution, and then the excess NaOH was titrated with 1-N sulfuric acid (factor: F). With respect to a blank sample, the same procedure was repeated. From the obtained date, the acetic acid content (%) was calculated according to the formula:

$$\text{Acetic acid content } (\%) = \{6.005 \times (B-A) \times F\}/W$$

in which A is the amount (ml) of 1-N sulfuric acid titrated for the sample, B is the amount (ml) of 1-N sulfuric acid titrated for the blank, F is the factor of 1-N sulfuric acid, and W is the weight of the sample.

(2) Average Molecular Weight and Molecular Weight Distribution of Cellulose Acylate The titled matters are measured by means of high performance liquid chromatography system (GPC-LALLS), which comprises a gel permeation column equipped with detectors for refractive index and light scattering. The conditions for measurement were as follows.

Solvent: methylene chloride
Column: GMH×1 (TOSOH CORPORATION)
Concentration of sample: 0.1 W/v %
Flow: 1 ml/minute
Injected amount: 300 μl
Standard: Methyl polymethacrylate (Mw=188,200)
Temperature: 23° C.

(3) Viscosity Average Polymerization Degree (DP) of Cellulose Acylate

The sample cellulose acylate was dried and precisely weighed in the amount of approx. 0.2 g, and dissolved in 100 ml of a mixed solvent of methylene chloride and ethanol (9:1, by weight). The dropping time (second) of the prepared solution was measured by means of an Ostwald viscometer at 25° C., and thereby the polymerization degree (DP) was calculated according to the following formulas:

$$\eta rel = T/T0,$$
$$[\eta] = ln(\eta rel)/C \text{ and}$$
$$DP = [\eta]/Km$$

in which T is the dropping time (second) of the sample, T0 is the dropping time (second) of the solvent alone, C is the concentration (g/l), and Km is $6 \times 10^{-4}$.

(4) Stability of Solution

The prepared solution (or slurry) was left at room temperature (23° C.), and then observed to evaluate the stability and thereby to classify into the following four grades A, B, C and D.

A: The solution was still transparent and homogeneous even after 20 days.

B: The solution kept transparency and homogeneity for 10 days, but became slightly turbid after 20 days.

C: The solution was transparent and homogeneous when it was prepared, but after 24 hours it gelled to be inhomogeneous.

D: The solution was opaque and inhomogeneous.

(5) Film

The prepared film was observed by the eyes to classify into the following four grades A, B, C and D.

A: The film was still transparent and homogeneous even after 20 days.

B: The film kept transparency and homogeneity for 10 days, but became slightly turbid after 20 days.

C: The film was transparent and homogeneous when it was prepared, but after 24 hours it gelled to be inhomogeneous.

D: The film was opaque and inhomogeneous.

(6) Tear Test of Film

The prepared film was cut into a piece (50 mm×64 mm), which was then subjected to the tear test according to ISO 6383/2-1983. The load for tearing each sample was thus obtained.

(7) Bending Test of Film

The prepared film was cut into a piece (length: 120 mm), which was then subjected to the bending test according to ISO 8776/2-1988. Thus, it was measured how many times the sample was repeatedly bent.

(8) Heat and Moisture Resistance of Film

The prepared film in the amount of 1 g was folded and placed in a 15 ml-glass bottle. The atmosphere in the bottle was controlled so that the temperature and the relative humidity might be 90° C. and 100%, respectively, and then the bottle was sealed. After the bottle was left at 90° C. for 10 days, the folded film was taken out and observed by the eyes to classify into the following four grades.

A: There was no change.

B: There was slight smell of decomposition.

C: There was considerable small of decomposition.

D: There was considerable small of decomposition, and the film was deformed by decomposition.

(9) Retardation Value (Re) of Film

For evaluating the retardation value in the plane (Re) of the film, the difference of refractive indexes in the lateral and longitudinal directions at 632.8 nm was measured by means of an ellipsometer [AEP-100, Shimadzu Seisakusho Ltd.]. The retardation value was then calculated from the obtained value and the thickness of the film according to the formula:

$$Re = (nx - ny) \times d$$

in which nx is the refractive index in the lateral direction, ny is that in the longitudinal direction, and d is the thickness of the film.

The smaller the Re value is, the less optical anisotropy in the plane the film has. The Re value is in the range of 0 to 300 nm, and a preferred Re value depends upon what the film is used for.

The retardation value in the depth direction (Rth) is also important, and is calculated from the thickness of the film and the birefringence along the thickness at 632.8 nm according to the formula:

$$Rth = \{(nx+ny)/2 - nz\} \times d$$

in which nx is the refractive index in the lateral direction, ny is that in the longitudinal direction, nz is that in the depth direction, and d is the thickness of the film.

The smaller the Rth value is, the less optical anisotropy along the depth the film has. A preferred Rth value depends upon what the film is used for. The cellulose acylate film of the invention has a Rth value generally in the range of 0 to 600 nm per 100 μm, preferably in the range of 0 to 400 nm per 100 μm.

(10) Haze of Film

The haze of the film was measured by means of a haze meter (1001DP, Nippon Denshoku Industries Co., Ltd.).

EXAMPLE 1

(1-1) Preparation of Cellulose Acylate Solutions

Cellulose acylate solutions were prepared through the following three dissolution processes. The solvent components and other data of each solution are set forth in Table 1. Silica particles (size: 20 nm), a mixture of triphenyl phosphate/biphenyl phosphate (ratio: 1/2) and 2,4-bis-(n-octylthio)-6-(4-hydroxy-3,5-di-tert-butylanilino)-1,3,4-triazine were added into each solution in the amounts of 0.5 wt. %, 10 wt. % and 1.0 wt. %, respectively, based on the amount of cellulose acylate.

(1-1a) Dissolution Process at Room Temperature

Each cellulose acylate shown in Table 1 was gradually added into the solvent while vigorously stirred, and stored at room temperature (25° C.) for 3 hours to swell well. The obtained swollen mixture was stirred and dissolved at 50° C. in a mixing tank equipped with a reflux condenser.

(1-1b) Cooling Dissolution Process

Each cellulose acylate shown in Table 1 was gradually added into the solvent while vigorously stirred, and stored at room temperature (25° C.) for 3 hours to swell well. The obtained swollen mixture was moderately stirred and cooled to −30° C. at the rate of −8° C./minute, and further cooled to the temperature shown in Table 1. After left at the temperature for 6 hours, the mixture was warmed at the rate of +8° C./minute. When became sol to a certain degree, the mixture was stirred and heated to 50° C. Thus, each dope was prepared.

(1-1c) Dissolution Process Under the Condition of High Pressure and High Temperature Each cellulose acylate shown in Table 1 was gradually added into the solvent while vigorously stirred, and stored at room temperature (25° C.) for 3 hours to swell well. The obtained swollen mixture was placed in a stainless-steel airtight container having dual structure. High-pressure steam was introduced into the outer jacket, and thereby the mixture in the container was heated at the rate of +8° C./minute. The mixture was left under the pressure of 1 Mpa at the temperature shown in Table 1 for 5 minutes. Water at 50° C. was then introduced into the outer jacket, and thereby the mixture in the container was cooled at the rate of −8° C./minute to obtain each dope.

(1-2) Filtration of Cellulose Acylate Solutions

Each obtained dope was filtered at 50° C. through a filter paper (absolute filtration precision: 0.01 mm, #63 TOYO ROSHI KAISHA LTD.), and further another filter paper (absolute filtration precision: 0.0025 mm, FH025 PALL CORPORATION).

(1-3) Preparation of Cellulose Acylate Films

Each cellulose acylate solution prepared in (1-2) was cast on a glass plate to form a film (dry thickness: 100 μm). The film was dried at 70° C. for 3 minutes, and further dried at 130° C. for 5 minutes. After peeled from the glass plate, the film was dried at 160° C. for 30 minutes. Thus, each cellulose acetate film was prepared.

TABLE 1

| | Cellulose acylate | | | | Dissolution method | |
|---|---|---|---|---|---|---|
| | Acetyl | Acyl of C3-5 | | | | |
| | Degree A | Acyl | Degree B | DP | Method | Temperature |
| I-1 | 2.7 | — | 0 | 300 | Cool | −70° C. |
| I-2 | 2.3 | Pr | 0.3 | 680 | Ordinary | 25° C. |
| I-3 | 2.4 | n-Bt | 0.1 | 450 | Cool | −20° C. |
| I-4 | 2.7 | — | 0 | 300 | Heat | 100° C. |
| I-5 | 2.6 | — | 0 | 250 | Heat | 100° C. |
| I-6 | 2.6 | — | 0 | 300 | Cool | −30° C. |
| I-7 | 2.7 | — | 0 | 350 | Cool | −40° C. |
| I-8 | 2.3 | — | 0 | 350 | Ordinary | 25° C. |
| I-9 | 2.7 | — | 0 | 300 | Cool | −70° C. |
| I-10 | 2.7 | — | 0 | 300 | Cool | −70° C. |
| I-11 | 3.0 | — | 0 | 300 | Heat | 75° C. |
| C-1 | 2.7 | — | 0 | 300 | Cool | −70° C. |
| C-2 | 2.7 | — | 0 | 300 | Cool | −70° C. |
| C-3 | 3.0 | — | 0 | 300 | Heat | 75° C. |

| | Solvents | | | | | | |
|---|---|---|---|---|---|---|---|
| | Non chlorine solvent | | Chlorine Solvent | | Alcohol | | |
| | Component | Ratio (wt. %) | Component | Ratio (wt. %) | Component | Ratio (wt. %) | Concentration (wt. %) |
| I-1 | MA/CH | 80/15 | None | | MOL | 5 | 20 |
| I-2 | MA/DX | 60/30 | None | | MOL/POL | 5/5 | 18 |

TABLE 1-continued

| | | | | | | | | |
|---|---|---|---|---|---|---|---|---|
| I-3 | AC/MA | 75/20 | None | | MOL/EOL | 5/5 | | 20 |
| I-4 | MA/DO | 60/10 | MC | 20 | MOL/BOL | 5/5 | | 19 |
| I-5 | MA/AA | 60/20 | None | | EOL | 10 | | 23 |
| I-6 | MA/MK/CP | 50/10/20 | None | | MOL/EOL | 5/5 | | 21 |
| I-7 | MA/DX/BT | 70/10/10 | None | | MOL/EOL | 5/5 | | 16 |
| I-8 | MA/MK | 80/10 | None | | MOL/EOL | 5/5 | | 18 |
| I-9 | MA/CH | 75/15 | None | | MOL/EOL | 5/5 | | 20 |
| I-10 | MA/CH | 45/5 | MC | 40 | MOL/EOL | 5/5 | | 20 |
| I-11 | MA/CH | 80/10 | None | | MOL/EOL | 5/5 | | 18 |
| C-1 | MA/AA | 20/80 | None | | None | | | 18 |
| C-2 | MA/DOE | 30/60 | MC | 10 | None | | | 18 |
| C-3 | MA | 45 | None | | MOL/OOL | 5/50 | | 20 |

(Remarks)
I: Present invention
C: Comparative example
Pr: Propionyl
Bt: Butyryl
Degree: Substitution degree
DP: Degree of polymerization
Cool: Cooling dissolution method
Ordinary: Method at room temperature
Heat: Method at high pressure and high temperature
MA: Methyl acetate
CH: Cyclohexane
MOL: Methanol
DX: 1,4-Dioxane
POL: 1-Propanol
AC: Acetone
EOL: Ethanol
DO: 1,3-Dioxolane
MC: Dichloromethane
BOL: n-Butanol
AA: Methyl acetoacetate
MK: Methyl ethyl ketone
CP: Cyclopentane
OOL: n-Octanol
DOE: Dioctyl ether (1-4) Results With respect to the aforementioned matters, the prepared solutions and films of cellulose acylate were evaluated. The results of S-1 to S-11 and CE-1 to CE-3 were set forth in Table 2. As shown in Table 2, the samples according to the invention (S-1 to S-11) were excellent in solution stability, mechanical strength of film, and optical characters. On the other hand, Comparison Examples (CE-1 and CE-2), which contained no alcohol, showed poor solution stability, and the films prepared from CE-1 and CE-2 had poor properties. The film prepared from CE-3, which contained too much alcohol, had poor heat resistance and gave a poor result in the bending test.

According to Japanese Patent Provisional Publication No. 6(1994)-134993, the dopes of S-1 and S-2 were co-cast so that S-1 and S-2 might be on the band side (bottom) and on the air (open) side (top), respectively. Thus, a layered film was prepared. The obtained film was evaluated in the same manner as above, and as a result it was confirmed that the film gave excellent results.

The prepared film was used in a liquid crystal display described in Example 1 in Japanese Patent Provisional Publication No. 10(1998)-48420, an optically anisotropic layer containing discotic liquid crystal molecules described in Example 1 in Japanese Patent Provisional Publication No. 9(1997)-26572, an orientation layer coated with polyvinyl alcohol, a liquid crystal display of VA mode shown in FIGS. 2 to 9 in Japanese Patent Provisional Publication No. 2000-154261, or a liquid crystal display of OCB mode shown in FIGS. 10 to 15 in Japanese Patent Provisional Publication No. 2000-154261. It was confirmed that all the thus-obtained optical elements worked well.

The results of S-1 to S-11 and CE-1 to CE-3 were set forth in Table 2.

TABLE 2

| | Stability of solution | Grade of film surface | Weight at tear test | Times at bending test | Heat and moisture resistance | Retardation value (Re) | Haze |
|---|---|---|---|---|---|---|---|
| I-1 | A | A | 22 kg | 120 | A | 5.2 nm | 0.1% |
| I-2 | A | A | 23 kg | 110 | A | 3.6 nm | 0.1% |
| I-3 | A | A | 20 kg | 120 | A | 4.4 nm | 0.1% |
| I-4 | A | A | 25 kg | 120 | A | 4.3 nm | 0.1% |
| I-5 | A | A | 22 kg | 120 | A | 4.2 nm | 0.1% |
| I-6 | A | A | 24 kg | 120 | A | 5.0 nm | 0.1% |
| I-7 | A | A | 23 kg | 120 | A | 5.1 nm | 0.1% |
| I-8 | A | A | 26 kg | 120 | A | 4.7 nm | 0.1% |
| I-9 | A | A | 27 kg | 110 | A | 3.2 nm | 0.1% |
| I-10 | A | A | 24 kg | 120 | A | 6.4 nm | 0.1% |
| I-11 | A | A | 22 kg | 100 | A | 5.5 nm | 0.1% |
| C-1 | C | C | 8 kg | 50 | C | 3.2 nm | 1.2% |
| C-2 | C | C | 20 kg | 100 | A | 6.4 nm | 5.7% |
| C-3 | B | B | 10 kg | 60 | B | 2.8 nm | 0.5% |

(Remarks)
I: Present invention
C: Comparative example

EXAMPLE 2

(2-1) Preparation of Cellulose Acylate Solutions

The cellulose acylates shown in Table 3 were washed with a mixture of acetone/water, to remove iron. The conditions for washing (how much acetone the mixture contained, how many times each cellulose acylate was washed) were shown in Table 3. After washed, the cellulose acylates were dried in air under the conditions (such as temperature and time) shown in Table 3.

Each resultant cellulose acylate was dissolved in dichloromethane to prepared a 0.1% solution. The iron content of the solution was then measured according to the atomic absorption spectroscopy.

Each cellulose acylate was absolutely dried and precisely weighed in the amount of approx. 0.2 g, and dissolved in 100 ml of a mixed solvent of methylene chloride and ethanol (9:1, by weight). The dropping time (second) of the prepared solution was measured by means of an Ostwald viscometer at 25° C., and thereby the polymerization degree (DP) was calculated according to the following formulas:

$\eta rel = T/T0$, $[\eta] = ln(\eta rel)/C$, and $DP = [\eta]/Km$ in which T is the dropping time (second) of the sample, T0 is the dropping time (second) of the solvent alone, C is the concentration (g/l), and Km is $6 \times 10^{-4}$.

Cellulose acylate solutions were prepared under dry nitrogen gas atmosphere (relative humidity: 0%) through the aforementioned three dissolution processes. Silica particles (size: 20 nm), a mixture of triphenyl phosphate/biphenyl phosphate (ratio: 1/2) and 2,4-bis-(n-octylthio)-6-(4-hydroxy-3,5-di-tert-butylanilino)-1,3,4-triazine were added into each solution in the amounts of 0.5 wt. %, 10 wt. % and 1.0 wt. %, respectively, based on the amount of cellulose acylate.

The square radius of inertia, second virial coefficient, heat of dissolution and reduced viscosity of each solution (dope) were measured in the blow-described manner, and the results are also set forth in Table 3.

TABLE 3

| | Cellulose acylate | | | | Dissolution method | |
|---|---|---|---|---|---|---|
| | Acetyl | Acyl of C3–5 | | | | |
| | Degree A | Acyl | Degree B | DP | Method | Temperature |
| I-12 | 2.7 | — | 0 | 300 | Cool | −70° C. |
| I-13 | 2.9 | Pr | 0.1 | 210 | Cool | −95° C. |
| I-14 | 2.5 | Bt | 0.5 | 540 | Cool | −50° C. |
| I-15 | 2.6 | — | 0 | 250 | Cool | −70° C. |
| I-16 | 2.8 | — | 0 | 330 | Heat | 75° C. |
| I-17 | 2.5 | — | 0 | 200 | Heat | 125° C. |
| I-18 | 2.9 | — | 0 | 330 | Heat | 180° C. |
| I-19 | 2.7 | — | 0 | 300 | Heat | 240° C. |
| I-20 | 2.7 | — | 0 | 300 | Ordinary | 25° C. |

| | Solvent | | | Washing | | |
|---|---|---|---|---|---|---|
| | Non chlorine solvent | | Chlorine | | | Fe |
| | Component | Ratio (wt. %) | solvent | Acetone | Times | (ppm) |
| I-12 | MA/AA/ME | 70/20/10 | None | 50% | 3 | 10 |
| I-13 | MA/ET/BT | 85/10/5 | None | 25% | 5 | 45 |
| I-14 | AC/MA/ET | 75/20/5 | None | 75% | 1 | 45 |
| I-15 | MA/ET/CH | 80/5/15 | None | 60% | 2 | 20 |
| I-16 | MA/MK/ET | 80/15/5 | None | 35% | 1 | 35 |
| I-17 | MA/DX/BT | 70/20/10 | None | 55% | 1 | 15 |
| I-18 | MA/ET | 90/10 | None | 40% | 1 | 25 |
| I-19 | MA/ET/CH | 80/5/15 | None | 65% | 4 | 7 |
| I-20 | MA/AA/ME | 70/20/10 | None | 50% | 3 | 10 |

| | Drying condition | | |
|---|---|---|---|
| | Temperature | Time | Water content |
| I-12 | 120° C. | 1 hour | 0.10% |
| I-13 | 100° C. | 5 hours | 0.15% |
| I-14 | 85° C. | 0.3 hour | 0.48% |
| I-15 | 190° C. | 0.2 hour | 0.23% |
| I-16 | 90° C. | 2 hours | 0.40% |
| I-17 | 160° C. | 0.7 hour | 0.09% |
| I-18 | 110° C. | 6 hours | 0.28% |
| I-19 | 140° C. | 3 hours | 0.07% |
| I-20 | 120° C. | 1 hour | 0.10% |

| | Dope Square radius of inertia | Second virial coefficient | Heat of dissolution | Reduced viscosity | Casting Elevation of pressure | Until dope begins tailing |
|---|---|---|---|---|---|---|
| I-12 | 130 nm | $1.3 \times 10^{-4}$ | 450 J/g | 0.15 | 1.3 | 55 km |
| I-13 | 150 nm | $0.2 \times 10^{-4}$ | 550 J/g | 0.20 | 1.5 | 50 km |
| I-14 | 60 nm | $3.3 \times 10^{-4}$ | 180 J/g | 0.28 | 2.4 | 29 km |
| I-15 | 80 nm | $0.1 \times 10^{-4}$ | 550 J/g | 0.17 | 1.7 | 37 km |
| I-16 | 90 nm | $2.0 \times 10^{-4}$ | 280 J/g | 0.23 | 2.1 | 38 km |
| I-17 | 100 nm | $-1.0 \times 10^{-4}$ | 350 J/g | 0.14 | 1.4 | 45 km |

TABLE 3-continued

| | | | | | | |
|---|---|---|---|---|---|---|
| I-18 | 70 nm | $-0.5 \times 10^{-4}$ | 400 J/g | 0.16 | 1.8 | 35 km |
| I-19 | 170 nm | $0.6 \times 10^{-4}$ | 700 J/g | 0.15 | 1.3 | 52 km |
| I-20 | 40 nm | $3.5 \times 10^{-4}$ | 140 J/g | 0.26 | 2.6 | 25 km |

(Remarks)
I: Present invention
Pr: Propionyl
Bt: Butyryl
Degree: Substitution degree
DP: Degree of polymerization
Cool: Cooling dissolution method
Ordinary: Method at room temperature
Heat: Method at high pressure and high temperature
MA: Methyl acetate
CH: Cyclohexane
ME: Methanol
DX: 1,4-Dioxane
AC: Acetone
ET: Ethanol
BT: Butanol
AA: Methyl acetoacetate
MK: Methyl ethyl ketone (2-1) Preparation of Cellulose Acylate Films Each above-prepared solution (dope) was sent to a filtering unit (filter paper No. 244 [Azumi Filter Paper Co., Ltd.] and flannel filter cloth) by means of a gear pump. The pressure fluctuation of the flowing dope was measured with a pressure gauge placed on the upstream side of the filtering unit, to determine the elevation of pressure according to the formula: P/P(0) in which P(0) is the pressure at the beginning and P is the pressure after 20 t of the dope passed through the gauge. The result are set forth in Table 3. A practically allowable elevation is 3 or less.

The filtered dope was sent to a casting die by means of a constant-pressure gear pump, and cast on a band-casting machine (effective length: 6 m, band temperature: 0° C.) to form a film (dry thickness: 100 µm). The film was blown with air for 2 seconds to dry. When the content of volatile component was reduced to 50 wt. %, the film was peeled off. In peeling the film, viscous lumps were formed at the casting die in a minute, and caused tailing. How long the dope was cast until the tailing happened is "cast length until the dope began tailing" shown in Table 3. A practically allowable length is 15 km or less.

The film was not fixed, and dried step-by-step at 100° C. for 3 minutes, at 130° C. for 5 minutes and at 160° C. for 5 minutes to evaporate the remaining solvent. In the drying, the film shrank freely.

Each end of the film was trimmed off by 15 cm, and then a knurl (height: 50 µm, width: 1 cm) was formed on each end (knurling treatment). Thus, a cellulose acylate film (width: 1.5 m) was prepared.

All the films prepared from the dopes gave excellent retardation (10 nm or less). They were stretched (MD) by 10% to 30%, and further stretched (TD) by 10% to 30% while dried on the band or after peeled from the band, and thereby the retardations were increased to 40 nm to 160 nm.

The haze of each film was also measured, and it was confirmed that all the cellulose acylate films of the invention gave haze of 0.5% or less.

The matters measured in Example 2 were obtained in the following manners.

(1) Square Radius of Inertia, Second Virial Coefficient

According to the static light-scattering method, the titled matters were measured through the following steps. In the measurement, samples are normally in the form of thin solution because of restriction of the measuring apparatus. However, the results suggest how the dopes of the invention behave as thick solutions.

(Step 1) Cellulose acylate was dissolved in the solvent under the condition of 25° C. and 10% RH, to prepare 0.1 wt. %, 0.2 wt. %, 0.3 wt. % and 0.4 wt. % solutions. Before weighed out, the cellulose acylate was beforehand dried at 120° C. for 2 hours not to absorb moisture.

(Step 2) Each solution was filtrated through a filter of Teflon (0.2 µm).

(Step 3) The static light scattering of each solution was measured at 25° C. within the angle range of 30° to 140° at intervals of 10° by means of a light-scattering spectrometer (DLS-700, OTSUKA ELECTRONICS CO., LTD.).

(Step 4) The obtained data were analyzed according to Berry plotting method with the data-analyzing program installed in the spectrometer. In the analysis, the refractive index and the concentration gradient thereof (dn/dc) were measured by means of an Abbe's refractometer and a differential refractometer (DRM-1021, OTSUKA ELECTRONICS CO., LTD.).

(2) Heat of Dissolution

The titled matter was measured through the following steps by means of a calorimeter (Multipurpose Calorimeter MPC-116, Tokyo Riko Co., Ltd.). In the measurement, samples are normally in the form of thin solution because of restriction of the measuring apparatus. However, the results suggest how the dopes of the invention behave as thick solutions.

(Step 1) 250 mg of Cellulose acylate was weighed out in a glass ampoule under the condition of 25° C. and 10% RH, to prepare each sample. Before weighed out, the cellulose acylate was beforehand dried at 120° C. for 2 hours not to absorb moisture.

(Step 2) 60 ml of the solvent was charged in a sample cell of the calorimeter, and the ampoule was set. In the reference cell, the solvent was alone charged.

(Step 3) The solvent in the sample cell was moderately stirred at 27° C. until the calorimeter was stabilized. The sample was then broken with a jig installed in the calorimeter, and generated heat was measured.

(Step 4) Independently, the resistor (100 Ω) installed in the cell-was electrified at 2 V for 15 minutes to obtain reference date, by which the above-obtained data of the sample were corrected.

(3) Reduced Viscosity

The titled matter was measured by means of an Ostwald viscometer through the following steps. In the measurement, samples are normally in the form of thin solution because of restriction of the measuring apparatus. However, the results suggest how the dopes of the invention behave as thick solutions.

(Step 1) Cellulose acylate was dissolved in the solvent under the condition of 25° C. and 10% RH, to prepare 0.1 wt. %, 0.2 wt. %, 0.3 wt. % and 0.4 wt. % solutions. Before weighed out, the cellulose acylate was beforehand dried at 120° C. for 2 hours not to absorb moisture.

(Step 2) Each solution was filtrated through a filter of Teflon (5 μm).

(Step 3) A capillary through which the solvent drops for 100±20 seconds at 25° C. was adopted.

(Step 4) The dropping time t(0) of the solvent and that t(X) of each dope having the concentration X% were measured, and thereby the relative viscosity ηsp was calculated according to the formula:

$$\eta sp = \{t(x) - t(0)\}/t(0).$$

(Step 5) Each obtained ηsp was plotted on the vertical axis while the concentration X was on the horizontal axis. The thus-obtained curve was extrapolated to the vertical axis (X=0) to find the intersection, which indicated the reduced viscosity [η].

(4) Substitution Degrees of Acetyl Group and Other Acyl Groups in Cellulose Acylate According to ASTMD817-91 (saponification method), the titled matters were measured through the following steps.

(Step 1) Dried cellulose acylate was precisely weighed and dissolved in a mixed solvent of acetone and dimethyl sulfoxide (DMSO)[4:1, by volume]. After 1-N NaOH aqueous solution was added, the solution was left at 25° C. for 2 hours to saponify the cellulose acylate. Phenolphthalein as an indicator was added to the solution, and then the excess NaOH was titrated with 1-N sulfuric acid (factor: F). With respect to a blank sample, the same procedure was repeated. From the obtained date, the substitution degrees were calculated according to the formulas:

$$T[A+B] = (E-M) \times F/(1000 \times W)$$

$$A = \{162.14 \times T[A+B]\}/\{1-42.14 \times T[A+B]+(1-56.0633\ T[A+B]) \times (Ca/Cb)\}$$

$$B = A \times (Ca/Cb)$$

in which

T[A+B] is the total amount of all the organic acids in terms of mol/g,

E is the amount (ml) of 1-N sulfuric acid titrated for the blank sample,

M is the amount (ml) of 1-N sulfuric acid titrated for the sample,

F is the factor of 1-N sulfuric acid,

W is the weight of the sample,

Ca is the amount of acetic acid measured with an ion-chromatography,

Cb is the amount of organic acids having 3 to 5 carbon atoms measured with an ion-chromatography, A is the substitution degree of acetyl group, and B is the substitution degree of organic acids having 3 to 5 carbon atoms.

I claim:

1. A process for producing a cellulose acylate film, comprising the steps of: dissolving cellulose acylate in a mixed solvent comprising a main solvent and an alcohol to prepare a solution, wherein the mixed solvent essentially does not contain chlorine atom, wherein the main solvent comprises an ester and a ketone, said ester having a solubility parameter of 16 to 23, said ketone having a solubility parameter of 16 to 23, and said alcohol having a solubility parameter of 20 to 30, and wherein the mixed solvent comprises the ester in an amount of 58 to 96 wt. %, the ketone in an amount of 2 to 15 wt. %, and the alcohol in an amount of 2 to 40 wt. %; and forming the film from the prepared solution.

2. The process as defined in claim 1, wherein the ester has 3 to 12 carbon atoms.

3. The process as defined in claim 1, wherein the ketone has 3 to 12 carbon atoms.

4. The process as defined in claim 1, wherein the alcohol has 1 to 8 carbon atoms.

5. The process as defined in claim 1, wherein each of the ester, the ketone and the alcohol has a boiling point of 250° C. or below.

6. The process as defined in claim 1, wherein the mixed solvent comprises the ester in an amount of 60 to 94 wt. %.

7. The process as defined in claim 1, wherein the mixed solvent comprises the ketone in an amount of 3 to 15 wt. %.

8. The process as defined in claim 1, wherein the mixed solvent comprises the alcohol in an amount of 3 to 30 wt. %.

9. The process as defined in claim 1, wherein the cellulose acylate has acyl groups substituting for hydroxyls of cellulose to satisfy all the following conditions (I) to (IV):

$$2.6 \leq A+B \leq 3.0 \quad \text{(I)}$$

$$2.0 \leq A \leq 3.0 \quad \text{(II)}$$

$$0 \leq B \leq 0.8 \quad \text{(III)}$$

$$1.9 < A - B \quad \text{(IV)}$$

in which A and B are substitution degrees of acyl groups substituting for hydroxyls of cellulose, A is the substitution degree of acetyl group, and B is that of acyl groups having 3 to 5 carbon atoms.

10. The process as defined in claim 1, wherein the cellulose acylate is cellulose acetate.

11. The process as defined in claim 1, wherein the step of dissolving cellulose acylate comprises a procedure for cooling to a temperature of −80 to 0° C.

12. The process as defined in claim 1, wherein the step of dissolving cellulose acylate comprises a procedure for heating to a temperature of 40 to 200° C.

13. The process as defined in claim 1, wherein the prepared cellulose acylate solution has a square radius of inertia in the range of 40 to 200 nm.

* * * * *